US007925987B2

(12) United States Patent
Gounares et al.

(10) Patent No.: US 7,925,987 B2
(45) Date of Patent: Apr. 12, 2011

(54) ENTRY AND EDITING OF ELECTRONIC INK

(75) Inventors: Alexander Gounares, Kirkland, WA (US); Steve Dodge, Sammamish, WA (US); Tobiasz A. Zielinski, Redmond, WA (US); Arin J. Goldberg, Woodinville, WA (US); Kyril Feldman, Kirkland, WA (US); Todd A. Torset, Woodinville, WA (US); Robert L. Chambers, Sammamish, WA (US); Richard K. Sailor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 10/183,990

(22) Filed: Jun. 28, 2002

(65) Prior Publication Data

US 2003/0215142 A1   Nov. 20, 2003

Related U.S. Application Data

(60) Provisional application No. 60/379,749, filed on May 14, 2002, provisional application No. 60/379,781, filed on May 14, 2002.

(51) Int. Cl.
*G06F 3/00* (2006.01)
(52) U.S. Cl. ........ 715/778; 715/541; 715/173; 715/779; 382/305; 382/187
(58) Field of Classification Search ................ 382/246, 382/305, 187, 311, 224, 514, 119; 715/541, 715/173, 778
See application file for complete search history.

(56) References Cited

U.S. PATENT DOCUMENTS

| | | | |
|---|---|---|---|
| 5,125,039 A | 6/1992 | Hawkins |
| 5,220,649 A | 6/1993 | Forcier |
| 5,309,555 A | 5/1994 | Akins et al. |
| 5,347,295 A | 9/1994 | Aguinick et al. |
| 5,367,453 A | 11/1994 | Capps et al. |
| 5,404,442 A | 4/1995 | Foster et al. |
| 5,463,696 A | 10/1995 | Beernink et al. |
| 5,500,937 A | 3/1996 | Thompson-Rohrlich |
| 5,513,309 A | 4/1996 | Meier et al. |
| 5,528,743 A | 6/1996 | Tou et al. |
| 5,534,893 A | 7/1996 | Hansen, Jr. et al. |
| 5,546,538 A | 8/1996 | Cobbley et al. |

(Continued)

FOREIGN PATENT DOCUMENTS

EP          0 566 293 A2    10/1993

(Continued)

OTHER PUBLICATIONS

Walid G. Aref, et al., "On Handling Electronic Ink", ACM Computing Surveys, vol. 27, No. 4, Dec. 1995, pp. 564-567.

(Continued)

*Primary Examiner* — Weilun Lo
*Assistant Examiner* — Mylinh Tran
(74) *Attorney, Agent, or Firm* — Woodcock Washburn LLP

(57) ABSTRACT

A control and its associated programming interface for allowing entry of electronic ink, editing and other manipulation of the ink, and/or recognition of the ink. Ink may be stored in a data structure such as an ink object that permits later retrieval by applications. As is the case with text that may be bolded, underlined, italicized, and the like, the describe control and its programming interface may permit ink information to be manipulated as easily as text, while providing the richness of handwritten ink.

21 Claims, 6 Drawing Sheets

U.S. PATENT DOCUMENTS

| | | | |
|---|---|---|---|
| 5,548,705 A | 8/1996 | Moran et al. | |
| 5,561,446 A | 10/1996 | Montlick | |
| 5,583,543 A | 12/1996 | Takahashi et al. | |
| 5,594,810 A | 1/1997 | Gourdol | |
| 5,596,350 A | 1/1997 | Capps et al. | |
| 5,680,480 A | 10/1997 | Beernink et al. | |
| 5,682,439 A | 10/1997 | Beernink et al. | |
| 5,710,573 A | 1/1998 | Hung et al. | |
| 5,710,831 A | 1/1998 | Beernink et al. | |
| 5,749,070 A | 5/1998 | Gourdol | |
| 5,761,328 A | 6/1998 | Solberg et al. | |
| 5,761,538 A | 6/1998 | Hull | |
| 5,798,769 A | 8/1998 | Chiu et al. | |
| 5,850,480 A | 12/1998 | Scanlon | |
| 5,862,256 A | 1/1999 | Zetts et al. | |
| 5,893,126 A | 4/1999 | Drews et al. | |
| 5,917,493 A | 6/1999 | Tan et al. | |
| 5,953,523 A | 9/1999 | Martinez et al. | |
| 6,000,946 A | 12/1999 | Snyders et al. | |
| 6,002,799 A * | 12/1999 | Sklarew | 382/189 |
| 6,055,332 A | 4/2000 | Aitani et al. | |
| 6,064,766 A | 5/2000 | Sklarew | |
| 6,088,481 A * | 7/2000 | Okamoto et al. | 382/189 |
| 6,101,280 A | 8/2000 | Reynolds | |
| 6,128,007 A | 10/2000 | Seybold | |
| 6,282,316 B1 | 8/2001 | Arai | |
| 6,320,601 B1 * | 11/2001 | Takasu et al. | 715/764 |
| 6,355,889 B1 | 3/2002 | Butcher et al. | |
| 6,356,655 B1 | 3/2002 | Sumikawa et al. | |
| 6,389,435 B1 | 5/2002 | Golovchinsky et al. | |
| 6,408,091 B1 | 6/2002 | Sakaguchi et al. | |
| 6,493,464 B1 | 12/2002 | Hawkins et al. | |
| 6,563,494 B1 | 5/2003 | Eichstaedt et al. | |
| 6,565,611 B1 * | 5/2003 | Wilcox et al. | 715/541 |
| 6,567,549 B1 * | 5/2003 | Marianetti et al. | 382/189 |
| 6,584,479 B2 | 6/2003 | Chang et al. | |
| 6,661,409 B2 * | 12/2003 | Demartines et al. | 345/173 |
| 6,687,876 B1 | 2/2004 | Schilit et al. | |
| 6,741,749 B2 * | 5/2004 | Herbert, Jr. | 382/246 |
| 6,813,396 B1 * | 11/2004 | Hollstrom et al. | 382/305 |
| 6,903,751 B2 | 6/2005 | Saund et al. | |
| 6,909,439 B1 | 6/2005 | Amro et al. | |
| 6,924,791 B1 | 8/2005 | Nicolas et al. | |
| 6,956,970 B2 | 10/2005 | Dresevic et al. | |
| 6,961,029 B1 | 11/2005 | Canova et al. | |
| 7,006,711 B2 | 2/2006 | Dresevic et al. | |
| 7,039,234 B2 | 5/2006 | Geidl et al. | |
| 2001/0040551 A1 * | 11/2001 | Yates et al. | 345/156 |
| 2002/0095440 A1 | 7/2002 | Burgess et al. | |
| 2002/0136462 A1 * | 9/2002 | Hebert, Jr. | 382/246 |
| 2003/0215140 A1 | 11/2003 | Gounares et al. | |
| 2006/0093218 A1 | 5/2006 | Gounares et al. | |
| 2008/0170789 A1 * | 7/2008 | Thacker | 382/186 |

FOREIGN PATENT DOCUMENTS

| | | |
|---|---|---|
| EP | 1363232 | 11/2003 |
| JP | 08069351 | 12/1996 |
| JP | 09160914 | 6/1997 |
| JP | 10069479 | 3/1998 |

OTHER PUBLICATIONS

Flohr: "Newton: Aufbau, Funktion, Programmierung", Newton, 1994, pp. 96-101.

Walid G. Aref, et al., "On Handling Electronic Ink", ACM Computing Surveys, vol. 27. No. 4, Dec. 1995, pp. 564-567.

David R. Millen, "Pen-Based User Interfaces", AT&T Technical Journal, May/Jun. 1993, pp. 21-27.

Nancy J. Freehafer, Handwriting Recognition in Office XP, Jul. 30, 2001.

"Photoshop® 6 Complete," 2001, Sybex Inc., pp. 123-153.

Official Communication from EP03009050.0-2218 dated Aug. 16, 2007.

\* cited by examiner ative to mouse interface as compared with the non-computer (i.e., standard) pen and paper. With the standard pen and paper, a # ENTRY AND EDITING OF ELECTRONIC INK

RELATED APPLICATIONS

This application claims priority to U.S. Provisional Application Ser. Nos. 60/379,749 and 60/379,781, both filed on May 14, 2002, both entitled "Interfacing With Ink," both expressly incorporated by reference herein as to their entire contents including their appendices.

FIELD OF THE INVENTION

Aspects of the present invention are directed generally to interfaces between software applications and/or data structures. More particularly, aspects of the present invention are directed to interfaces for exchanging information with electronic ink and/or for allowing entry and/or editing of electronic ink.

BACKGROUND

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document onscreen because of the ability to freely make notes outside of the confines of the keyboard and mouse interface.

Some computer systems permit a user to draw on a screen. For example, the Microsoft READER application permits one to add electronic ink (also referred to herein as "ink") to a document. The system stores the ink and provides it to a user when requested. Other applications (for example, drawing applications as known in the art are associated with the Palm 3.x and 4.x and PocketPC operating systems) permit the capture and storage of drawings. Also, various drawing applications such as Coral Draw and photo and editing applications such as Photoshop may be used with stylus based input products, such as the Wacom tablet product. These drawings include other properties associated with the ink strokes used to make up the drawings. For instance, line width and color may be stored with the ink. One goal of these systems is to replicate the look and feel of physical ink being applied to a piece of paper. However, physical ink on paper may have significant amounts of information not captured by the electronic collection of a coordinates and connecting line segments. Some of this information may include the thickness of the pen tip used (as seen through the width of the physical ink) or angle of the pen to the paper, the shape of the pen tip, the speed at which the ink was deposited, and the like.

Another problem has arisen with electronic ink. It has been considered part of the application in which it is written. This leads to a fundamental inability to provide the richness of electronic ink to other applications or environments. While text may be ported between a variety of application (through use, for example, of a clipboard), ink fails to have this ability of being able to interact with the ink. For example, one could not create an image of a figure eight, copy and paste the created image into a document by means of the clipboard, and then make the ink bold. One difficulty is the non-portability of the image between applications.

SUMMARY OF THE INVENTION

Software developers in general are familiar with the conventional Win32 RichEdit control that allows a user to enter and edit formatted text. Aspects of the present invention are directed to extending the functionality of the RichEdit control to further provide the ability to accept electronic ink handwriting. The handwriting may further be recognized and converted to text, either automatically after a time delay, or at a later time upon request. Where the ink is not converted to text, the original electronic ink may be stored, such as in an object-type data structure. Accordingly, aspects of the present invention may aid in the addition of electronic ink support to existing and future applications.

Further aspects of the present invention provide a flexible and efficient interface for interacting with properties, invoking methods and/or receiving events related to electronic ink, thereby solving one or more of the problems identified with conventional devices and systems. Some aspects of the present invention relate to improving the content of stored ink. Other aspects relate to modifying stored ink. Still further aspects relate to providing for the interoperability of ink and text.

These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Below is described a way to capture, recognize, interface with, edit or otherwise manipulate, and/or display electronic ink.

General Computing Platforms

Figure 1:
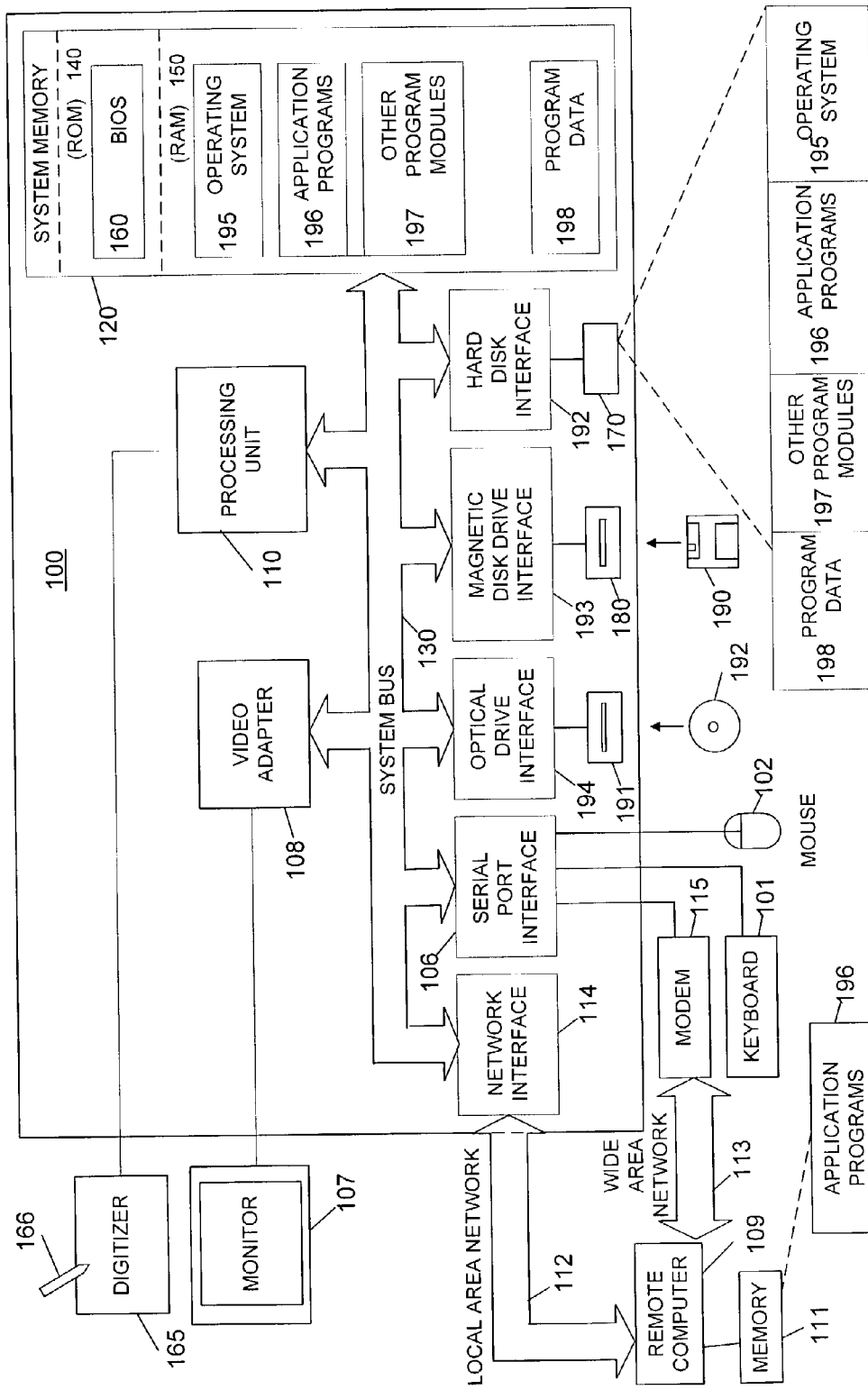
FIG. 1 is a functional block diagram of an illustrative general-purpose digital computing environment that can be used to implement various aspects of the invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during startup, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
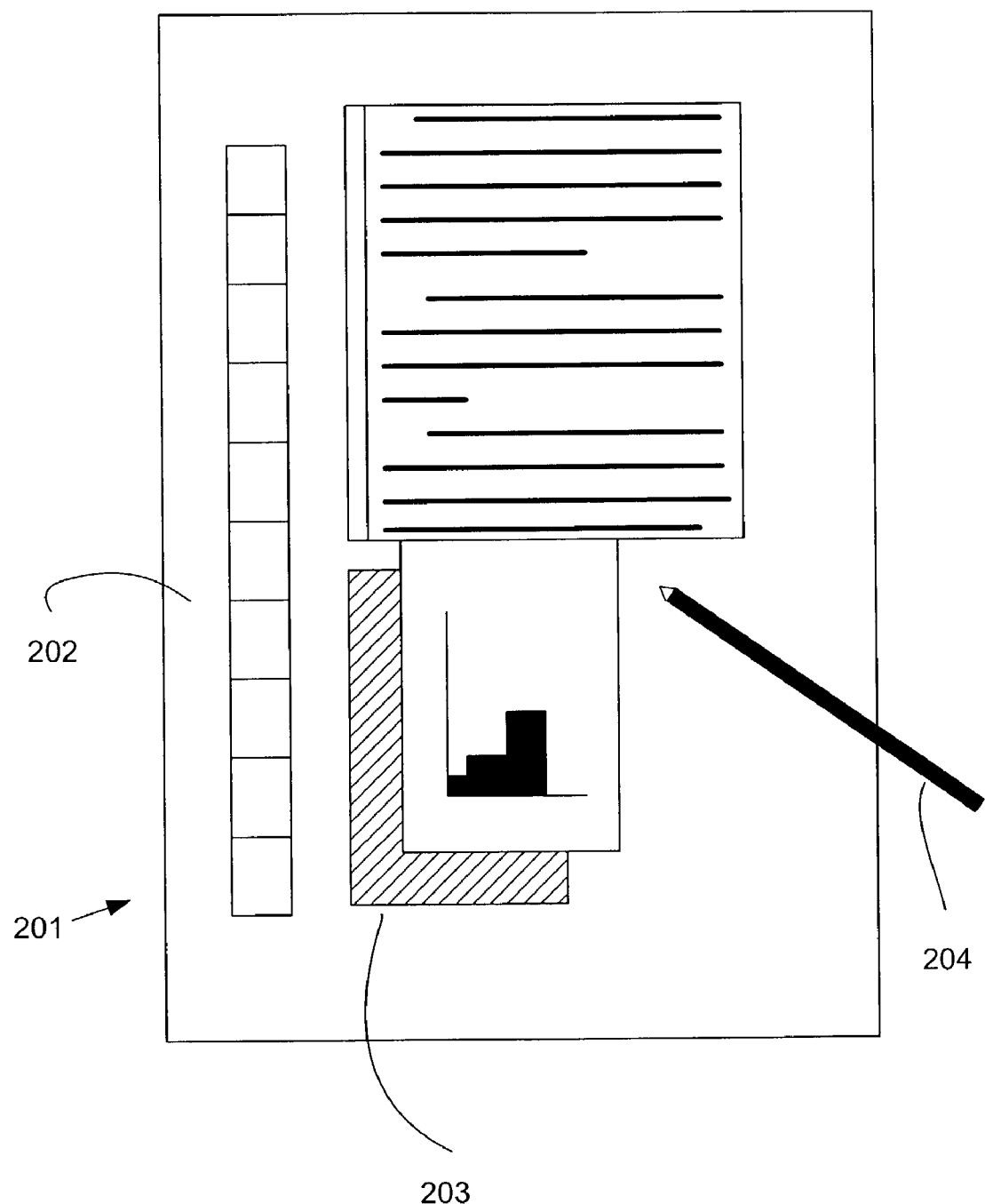
FIG. 2 is a plan view of an illustrative tablet computer and stylus that may be used in accordance with various aspects of the invention.

FIG. 2 shows an example of a stylus-based computer processing system (also referred to as a tablet PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Other display technologies that may be used include, but are not limited to, OLED displays, plasma displays, and the like. Using the tip of the stylus 204 (the tip also being referred to herein as a "cursor"), a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Electronic Ink and the Concept of an Ink Object

Ink as used herein refers to electronic ink. The electronic ink may be structured as a sequence or set of strokes, where each stroke includes a sequence or set of points. A sequence of strokes and/or points may be ordered by the time captured and/or by where the strokes and/or points appear on a page. A set of strokes may include sequences of strokes and/or points, and/or unordered strokes and/or points. The points may be represented using a variety of known techniques including Cartesian coordinates (X, Y), polar coordinates (r, Θ), and other techniques as known in the art. A stroke may alternatively be represented as a point and a vector in the direction of the next point. A stroke is intended to encompass any representation of points or segments relating to ink, irrespective of the underlying representation of points and/or what connects the points. Ink collection typically begins at a digitizer (such as the digitizer of the display surface 202). A user may place a stylus on the digitizer and begin to write or draw. At that point, new ink packets (i.e., packets of ink-related data) may be generated. The user may also move the stylus in the air proximate enough to the digitizer so as to be sensed by the digitizer. When this occurs, packets of data (called herein "in-air packets") may be generated according to the sensed in-air movements of the stylus. Packets may include not only position information but also stylus pressure and/or angle information.

To store ink, an ink object may be created that represents the original strokes of ink drawn by the stylus 204 upon the display surface 202 and/or other input. The collected strokes of ink may be collected from anywhere on the display surface 202 or only from a defined portion thereof, such as a particular window. The Ink object is essentially a container of ink data. The particular format of how ink is stored in the ink object is not important to the present invention. It is preferable, however, that the ink strokes as originally drawn are stored in the ink object.

Two illustrative types of ink objects may be defined. A tInk object (the "t" meaning "text") may be embodied as an OLE object representing ink that is expected to form letters or words. The tInk object allows the handwritten ink to be converted to text, such as by a text recognizer. The tInk object may be referred to as an ink object that relates to ink and having a textual context. The color and/or font size of the textual ink, as well as whether the textual ink should be underlined, bold, italic, and/or the like may be set programmatically and may be based on the attributes of the text around the tInk object. In other words, the ambient properties at the tInk object's intended insertion point may be applied to the tInk object. In one embodiment, the tInk object contains only a single word for submission to the text recognizer, such that a sentence may contain multiple tInk objects. On the other hand, an sInk object (the "s" meaning "sketch") may also be defined as an object representing ink that is not expected to form words. The sInk object may also be an OLE object. An sInk object may therefore be interpreted as a drawing or any other non-textual context. A sInk object may also be useful for representing multiple words. An ink-compatible application (and/or the user) may mark certain Ink objects as tInk objects and others as sInk objects. For the purposes of description, the two types of ink are described herein as "tInk" and "sInk." It is appreciated, however, that other names may be used to represent the various types of ink object that may be used. Also, alternative types of objects may be used to store electronic ink in any desired format.

InkCollector Object

An object (called herein an "InkCollector" object) may be defined and used to capture ink from an ink input device and/or deliver ink to an application. The InkCollector object acts, in a sense, as a faucet that "pours" ink into one or more different and/or distinct ink objects by collecting the ink as one or more ink strokes and storing the ink in one or more associated ink objects. The InkCollector object may attach itself to a known application window. It then may provide real-time inking on that window by using any or all available tablet devices (which may include the stylus 204 and/or a mouse). To use the InkCollector object, the developer may create it, assign which window to collect drawn ink in, and enable the object. After the InkCollector object is enabled, it may be set to collect ink in a variety of ink collection modes, in which ink strokes and/or gestures are collected. A gesture is a movement or other action of the stylus 204 that is interpreted not as rendered ink but as a request or command to perform some action or function. For example, a particular gesture may be performed for the purpose of selecting ink, while another gesture may be for the purpose of italicizing ink. For every movement of a stylus upon or proximate to the digitizer input, the InkCollector object will collect a stroke and/or a gesture.

InkEdit Control

A control may be defined, herein called an "InkEdit" control, that provides an easy way to capture, recognize, and/or display ink (e.g., in text form). The InkEdit control may further support displaying ink as an embedded object (e.g., as a tInk embedded object, programmatically accessible via an ink selection property) with ink-formatting and/or text-formatting capabilities, such as bold, underline, italics, superscript, subscript, justification, and the like. The primary intended use of this control is to allow entry of ink and to display either the ink or the text recognized from the ink. This control may further allow editing and/or formatting of the ink and/or the recognized text.

A well-known Microsoft WINDOWS user interface is the edit control (i.e., RichEdit and RichTextBox). Embodiments of the InkEdit control provide developers an extended ink version of these controls they are already familiar with and are likely already using in their applications, and add various features to the existing RichEdit control to accept text from a stylus, mouse, and/or other pointer, in addition to the existing ability to accept text from a keyboard. For example, in one embodiment, the InkEdit control provides the ability to accept electronic ink handwriting and recognize and convert that ink to text. The InkEdit control may further provide the ability to accept handwriting as ink for later recognition, such that the handwriting itself is editable.

To use the InkEdit control, a developer need simply instantiate the InkEdit control. The developer and/or runtime user may further apply one or more modes to the InkEdit control various features. For example, one mode may indicate whether ink should be inserted as ink or text. The InkEdit control may manage many of the internal mundane details of establishing a tablet context, listening for digitizer events, collecting strokes, feeding the strokes into a recognizer, and/or feeding the results of recognition (which may be, e.g., OLE embedded objects) into the InkEdit control for display and later persistence.

In one illustrative embodiment, the InkEdit control may be implemented in ActiveX and Win32 and be based on a conventional Microsoft Win32 Rich Edit control. In another illustrative embodiment, the InkEdit control may be implemented in Microsoft .NET and be based on the Win32 InkEdit and RichEdit controls, as well as the Microsoft .NET RichTextBox control. As is well known, the Microsoft RichEdit and RichTextBox controls allow a user to enter, edit, format, print, and save text while providing various advanced formatting features (such as text font, color, formatting, etc.). The InkEdit control of the present invention may thus have many of the features provided by the RichEdit and RichTextBox controls, except that these features may now be applied to ink as well as to conventional text. Ink may become a first-class citizen in and of itself. As is the case with text that may be bolded, underlined, italicized, and the like, the InkEdit control and its programming interface may permit ink information to be manipulated as easily as text, while providing the richness of handwritten ink.

In some embodiments, the InkEdit control is designed to work well in a form scenario for single line as well as multi-line text entry and editing. The InkEdit control may get ink input from a user in the form of textual handwriting. The ink input may be recognized and printed text may be inserted in its place. The default user interface for InkEdit may resemble that of the conventional RichTextBox control, except when the user is inking. The InkEdit control may display either original ink or recognized text (or both). The displayed ink may be scaled to the current input font size of the InkEdit control and may be displayed inline with other text, and/or may otherwise be altered in its position, size, and/or color. Alternatively, the displayed ink may retain its original position, size, and/or color.

In one illustrative embodiment, the default behavior for the InkEdit control is to recognize and convert the ink into text after a brief recognition timeout has expired. This recognition timeout may be any amount of time as desired, such as about 2000 milliseconds, or in the range of about 100 milliseconds to about 5000 milliseconds, or in the range of about 200 milliseconds to about 2000 milliseconds. Where the recognition timeout is set to zero, this may disable automatic recognition. Because the InkEdit control may be a super-class of Rich Edit, it may further be possible to embed and display ink within the InkEdit control. Each ink word may be inserted into the control as an Ink object (e.g., a tInk object). The Ink object may contain the ink and one or more properties associated with the ink.

When inserted, the ink may be scaled to the current font size and other ambient properties, such as italics or bold, are applied. Should the user choose to edit the text of an Ink object, the user may first convert the ink to text.

Figure 3:
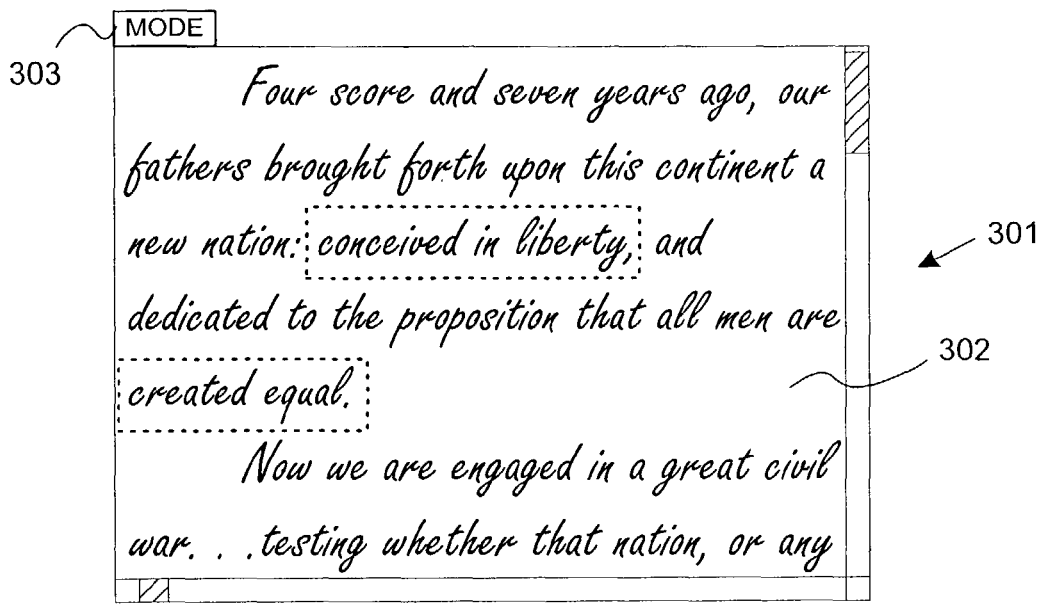
FIGS. 3-6 are various illustrative screen shots of a graphical user interface in accordance with various aspects of the present invention.
Figure 4:
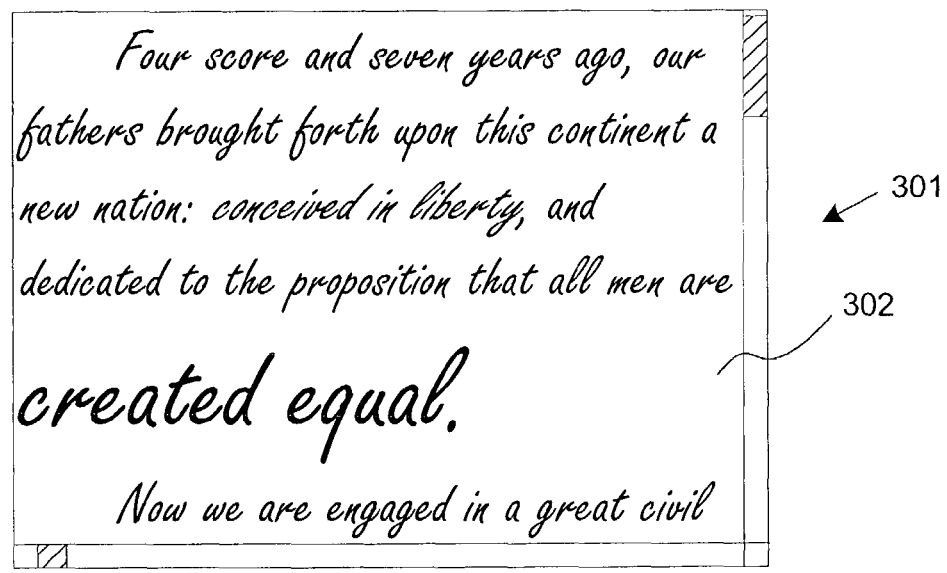

Referring to FIG. 3, the InkEdit control may appear on the display in association with a graphical user interface 301. The graphical user interface 301 may include one or more display spaces 302 for receiving drawn ink data and/or for displaying ink and/or text. The graphical user interface may receive data, such as ink data drawn by the stylus 204 in the display space 302, and the InkEdit may interpret that data as ink. The InkEdit control may further associate the ink with one or more properties such as bold, underline, italics, superscript, subscript, justification, color, size, and/or the like, as chosen by the application developer, the user, and/or automatically. As shown in FIGS. 3 and 4, some of the ink may be selected and provided a property, where, for example, the handwritten ink words "conceived in liberty" are selected and then italicized, and the handwritten ink words "created equal" are selected (shown by the broken box in FIG. 3) and then increased in size. The InkEdit control may further cause the ink and its associated properties to be stored as an ink object. Thus, for example, the ink in the display space 302 may be stored in one or more ink objects, and the words "conceived in liberty" may be stored in the ink object to be associated with an italics property. In response to the ink data being received, the InkEdit control may cause the ink to be displayed. In one embodiment, the ink is displayed in the display space 302 at, e.g., the same location(s) within the display space 302 where the ink data is received.

Figure 5:
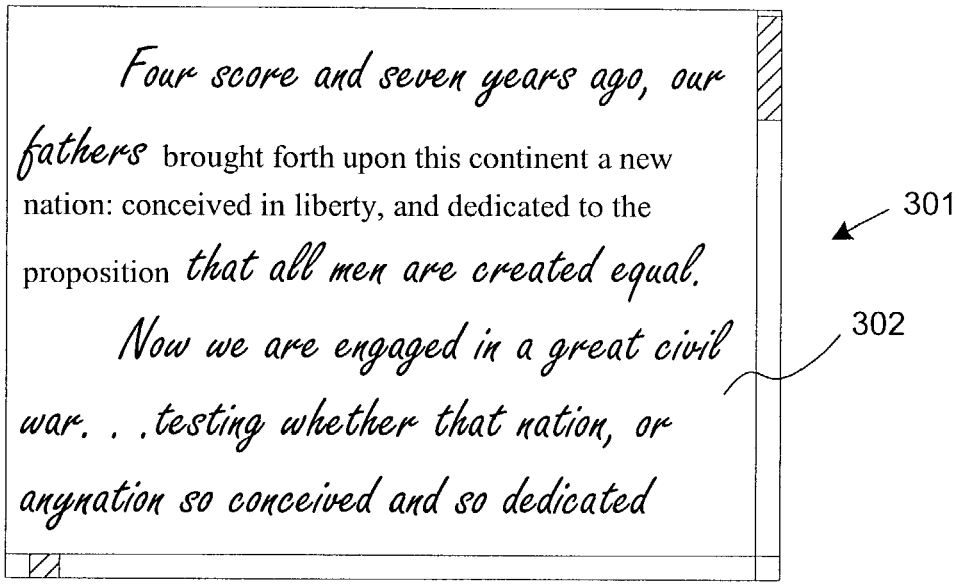
Figure 6:
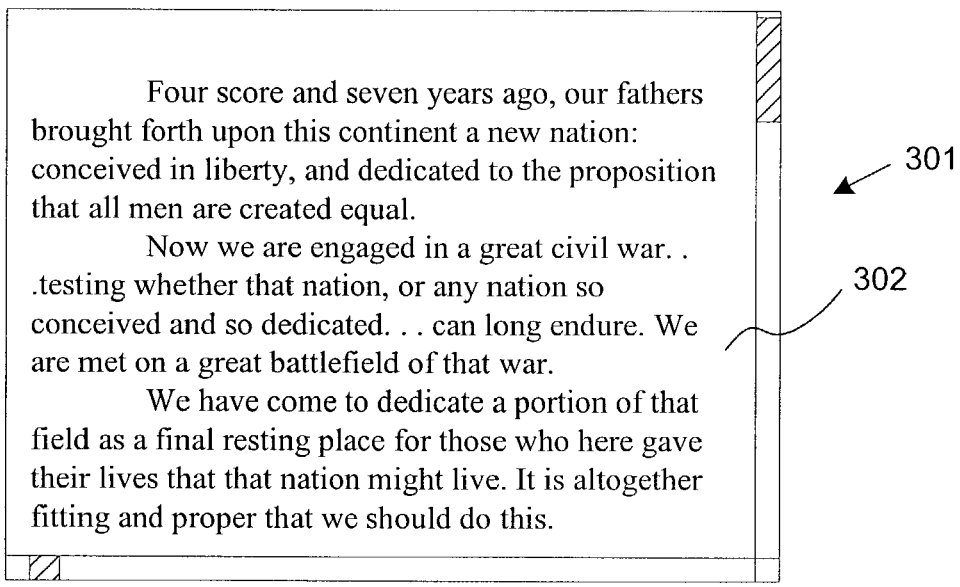

The ink may remain displayed (i.e., persist) within the display space 302, or the ink may be recognized and/or converted into text. This recognition and/or conversion may take place immediately, after the recognition timeout, and/or upon command (e.g., from a user or from an application). Where the ink is recognized and/or converted to text in response to a timeout condition, the recognition timeout may be for any amount of time desired, such as about 2000 milliseconds, or in the range of about 100 milliseconds to about 5000 milliseconds, or in the range of about 200 milliseconds to about 2000 milliseconds. A timer for timing the recognition timeout may start in response to the stylus 204 lifting off the display surface 202 and/or in response to a stroke ending, and may be canceled upon the stylus 204 returning to the display surface 202 before the timeout condition occurs. Other events that may cause the timer to start include the stylus 204 stopping movement upon the display surface 202, a gesture from the stylus 204, another input such as a button, and/or the like. The ink may or may not be recognized and/or displayed as printed text depending upon the setting of one or more mode switches. The one or more mode switches may be associated with one or more displayed elements (e.g., displayed element 303) or may be hidden from the user (i.e., not shown on the display). Where the switch is in a first setting, the ink will not be recognized or displayed as text. In some embodiments, the ink may still be recognized and/or displayed as text in response to a particular command. Where the switch is in a second setting, the ink may be recognized and/or displayed as text (either immediately, after a timeout, or upon command as discussed herein). Where the ink is displayed as text, the text that results from the recognition may be displayed to replace the ink in the display space 302 such that the ink being replaced is no longer displayed in the display space 302. FIG. 5 illustrates a portion of the ink in the display space 302 having been recognized and converted to text, and FIG. 6 illustrates all of the ink in the display space 302 having been recognized and converted to text. In these illustrative figures, the script writing represents the original handwritten ink and the printed font represents the recognized text.

The ink may be recognized by a single recognizer or by a plurality of recognizers, such as a collection of recognizers. The recognizers may include one or more gesture recognizers and/or text recognizers. A selection of ink to be recognized may further be associated with a particular recognition context, which may include a so-called "factoid" property, along with one or more various recognition properties. The factoid property may be considered a set of "hints" that are provided to the recognition context to assist in more accurate contextual recognition of ink. A recognizer context object may be defined that represents the ability to perform ink recognition, retrieve the recognition result, and/or retrieve alternate recognition results. The recognizer context object may enable the various recognizers installed on a system to process input appropriately by performing ink recognition. At least two types of recognition may be performed including background recognition or foreground recognition. Background recognition occurs in the background processing of the system and may be stopped due to other system events (created by the user or otherwise). In contrast, foreground recognition is generally initiated by a user and does not stop until the recognition is completed. The recognition context object may receive ink strokes that are to be recognized and the factoid property may define the constraints and/or other parameters on the input ink and the desired recognition output. For example, constraints that may be set include the language, dictionary, and/or grammar to be used during recognition. Where the InkEdit control is used in connection with a form, a different recognizer context and/or factoid may be set for each data entry field in the form. The various data entry fields may be specific to certain sets of information, such as telephone number fields having numbers, plus signs, dashes and parentheses; zip code fields having numbers and dashes only; state abbreviations having capital letters only; universal resource locators (URLs); and the like.

One potential benefit of having different recognizer contexts and/or factoids is that, in some embodiments, the timeframe that recognition occurs, or what triggers recognition, may be adjusted. For example, for name or comment fields in a form, it may be desired that recognition occur at the end of each word. However, when using state, street/apartment number, or zip code fields (for example), it may be desired that recognition occur after each character is written. In some instances, this character-by-character recognition may be used to provide greater recognition accuracy than may be achieved by recognizing a group of characters together.

Figure 7:
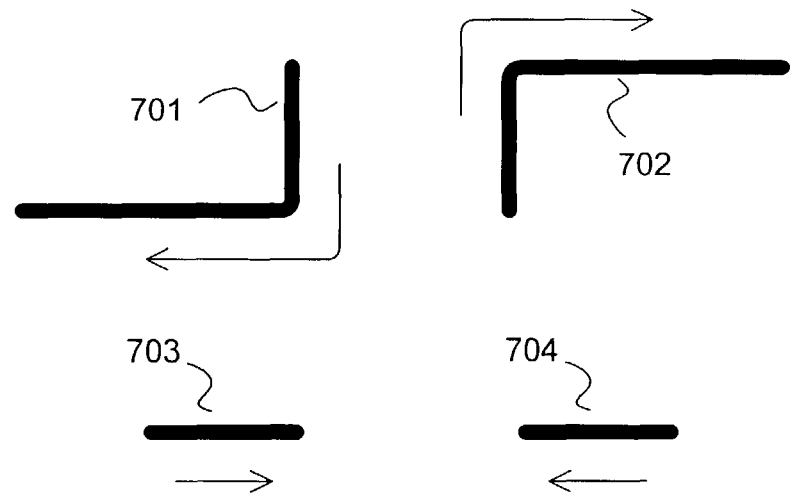
FIG. 7 shows various illustrative gestures that may be used in accordance with various aspects of the present invention.

The InkEdit control may further provide gesture support, and may generate events responsive to gestures. Referring to FIG. 7, various gestures may be supported, such as the illustrative gestures 701-704 as shown. For example, gesture 701 may represent a carriage return, gesture 702 may represent a tab command, gesture 703 may represent a space character, and gesture 704 may represent a backspace command. Many other gestures are possible.

The InkEdit control may further provides a correction user interface that allows users to view alternate recognition results, use an on-screen keyboard, and/or use character, letter, and/or block text recognizers as desired. Also, the InkEdit control may allow persistence and loading of its data using the same save and load mechanisms as the conventional Windows Forms RichTextbox control.

InkEdit API

Figure 8:
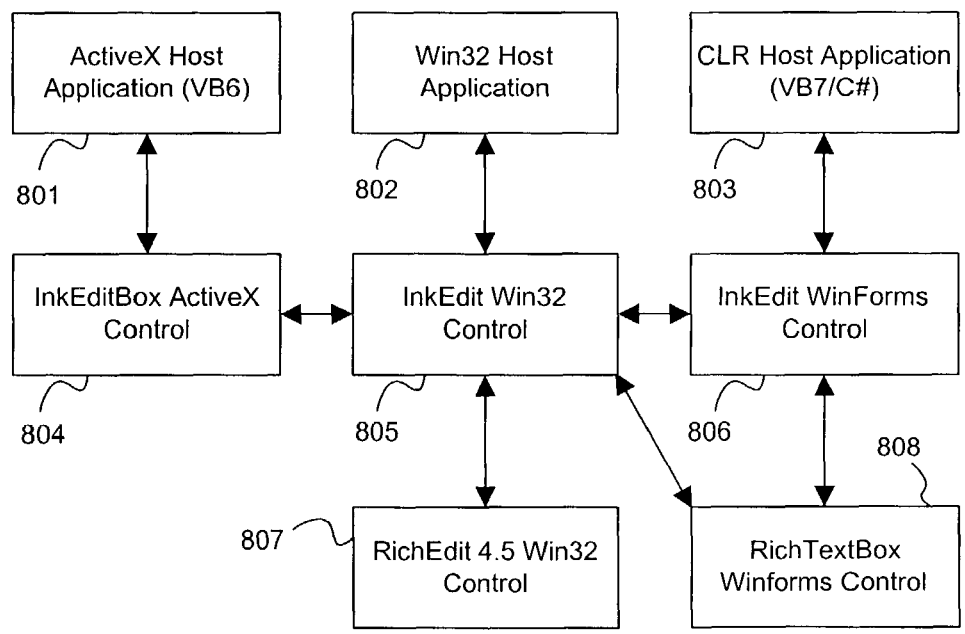
FIG. 8 is a functional block diagram showing an illustrative system environment in accordance with various aspects of the present invention.

The InkEdit control exposes a variety of functionality to the user through its application programming interface (API). Depending upon the host application, various flavors of the InkEdit API may be provided. Referring to FIG. 8, an illustrative system may include one or more of the following: An ActiveX Host Application 801, a Win32 Host Application 802, and/or Common Language Runtime (CLR) Host Application 803. In addition, an InkEdit ActiveX control 804 may be defined and may interface with the ActiveX Host Application 801. An InkEdit Win32 control 805 may further be defined and may interface with the Win32 Host Application 802. An InkEdit WinForms control 806 may be defined and may interface with the CLR Host Application 803. Finally, a RichEdit 4.5 Win32 control 807 may be defined that interfaces with any or all of the various flavors of InkEdit controls 804, 805, 806. The InkEdit Win32 control 805 may be the basis for the other two controls (ActiveX control 804 and Winforms control 806). In one embodiment, key functionality may be implemented in the Win32 control 805 such as the collection of ink, the interaction with the recognizer(s), and/or subclassing the RichEdit Win32 control 807. The ActiveX InkEdit control 804 may use C++ classes defined by the Win32 InkEdit control 805 and may build on that functionality to create ActiveX support. The Winforms InkEdit control 806 may derive from a Winforms RichTextBox 808 and may extend it with inking functionality as discussed herein. The Winform InkEdit control 806 may extend functionality by, e.g., first loading a Win32 InkEdit control instead of the RichEdit control and adding new methods, properties, and/or events as desired on top of the existing API elements provided by the RichTextBox 808. Note that FIG. 8 depicts an illustrative set of relations between controls in various hosting environments, and as such the arrows between the controls are not intended to be limiting in any way.

Figure 9:
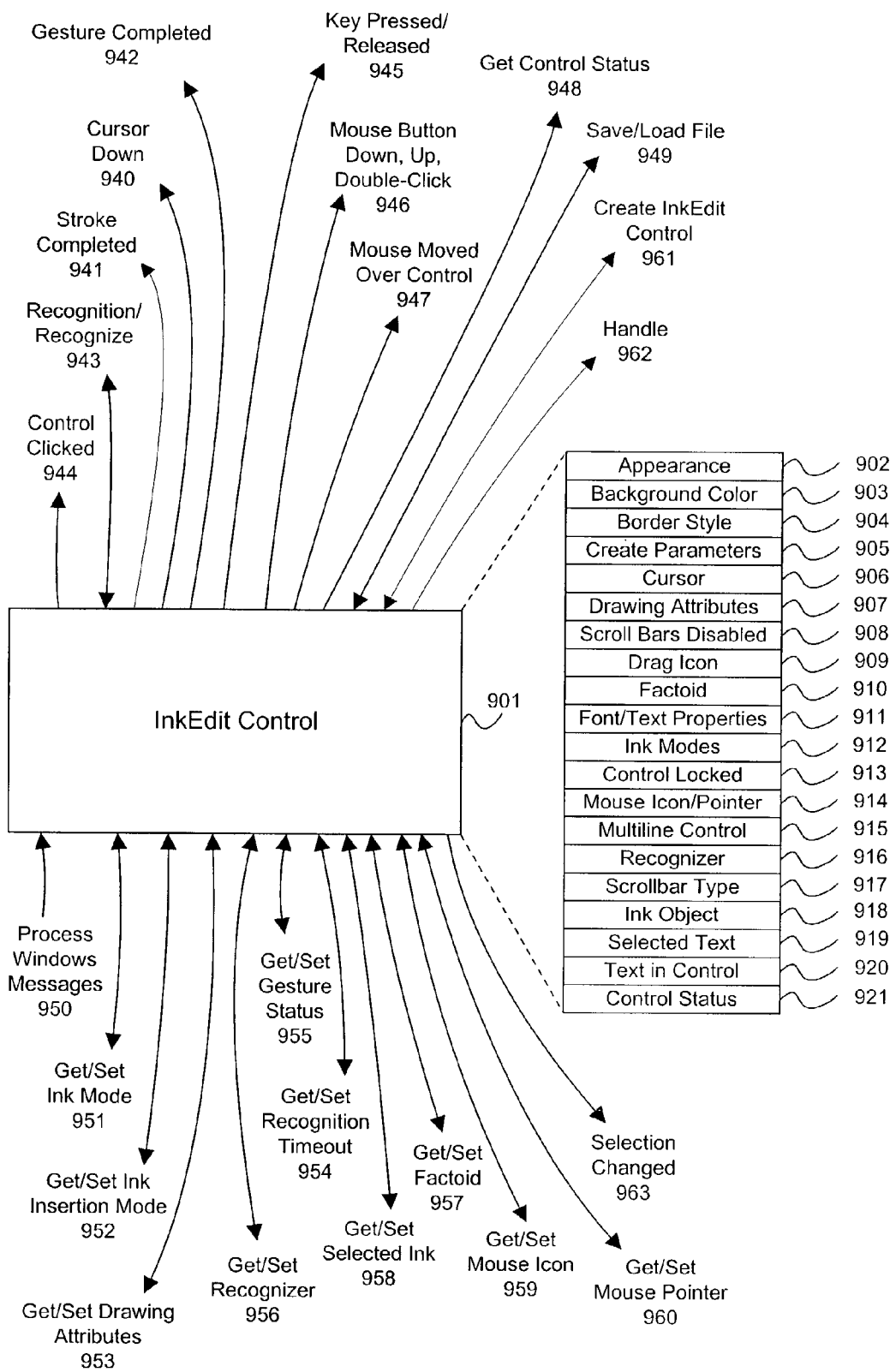
FIG. 9 is a functional block diagram of an illustrative application programming interface in accordance with various aspects of the present invention.

An illustrative API for the InkEdit control is now discussed with reference to FIG. 9. In FIG. 9, an InkEdit control 901 is represented by a box, and various elements (or functionally-grouped elements) of an API are shown as labeled arrows 940-960 emerging from and/or entering the box representing the InkEdit control 901. In general, arrows entering the InkEdit control 901 box refer to API elements (or functionally-grouped elements) that for the most part modify the InkEdit control 901 (e.g., by changing one of its properties) and/or otherwise provide information to the InkEdit control 901. Arrows emerging from the InkEdit control 901 box refer to API elements (or functionally-grouped elements) that for the most part represent a flag or some other information that is provided by the InkEdit control 901 to its environment. However, the directions of the arrows are illustrative and not intended to be limiting, and so an arrow entering the InkEdit control 901 is not prevented from also representing information provided by the InkEdit control 901 to its environment. Likewise, an arrow emerging from the InkEdit control 901 is not prevented from also modifying or providing information to the InkEdit control 901. FIG. 9 further shows a plurality of properties 902-921 of the InkEdit control 901. The below-discussed API elements may be utilized in any combination or subcombination for any flavor of an InkEdit-type control, including but not limited to the Win32, ActiveX, and NET flavors discussed herein.

The InkEdit API in the illustrative embodiment has some or all of the following enumerations and structures (not shown), in any combination or subcombination. For example, an appearance enumeration defines one or more values that specify whether the InkEdit control 901 appears flat or in three-dimensional when displayed. A border-style enumeration defines one or more values that specify whether the InkEdit control 901 has a border. An ink-mode enumeration defines one or more values that specify the collection mode settings for drawn ink—whether ink collection is disabled, whether only ink is to be collected, or whether both ink and gestures are to be collected. An insert-mode enumeration defines one or more values that specify how ink is inserted onto the InkEdit control 901, either as ink or as recognized text. An InkEdit status enumeration defines one or more values that specify whether the InkEdit control 901 is idle, collecting ink, or recognizing ink. A load/save enumeration defines one or more values that specify whether a file is loaded and/or saved as a Rich Text Format (RTF) file, a text file, or a file in other format. A mouse-button enumeration defines one or more values that specify which mouse button was, or is being, pressed. Note that, unless otherwise specified, all references to a mouse or a mouse button herein may equally apply to a stylus and a stylus button. A scrollbars enumeration defines one or more values that specify whether the InkEdit control has horizontal and/or vertical scrollbars. An alignment enumeration defines one or more values that specify whether a paragraph as displayed is aligned along the left or right margins of the InkEdit control, or between the left and right margins. A stroke-information structure contains information about a specific stroke, such as which cursor was used to create the stroke and where the stroke is stored (e.g., as a particular stroke object). A gesture-information structure contains information about a specific gesture, such as which cursor was used to create the gesture, the strokes that make up the gesture, and/or where the gesture is stored (e.g., as a particular gesture object). The stroke-information and gesture-information structures may be used with particular success in the Win32 flavor of the InkEdit control. A recognition-results structure contains information regarding the results of text recognition and is send in response to a recognition result being ready. The notification as to where some or all of these herein-discussed structures are used may be provided via, e.g., a separate notification message.

The InkEdit API in the illustrative embodiment also has one or more of the following properties, in any combination or subcombination, that can be set and that can return the information they represent. For example, an appearance property 902 represents whether the InkEdit control 901 is displayed as being flat or in three dimensions. A background-color property 903 represents the background color for the InkEdit control 901. A border-style property 904 represents whether the InkEdit control 901 has a border. A create-parameters property 905 represents creation parameters when the InkEdit control 901 handle is created. A cursor property 906 represents the cursor that is displayed when the mouse pointer is over the InkEdit control 901. Drawing-attributes properties 907 represent the default drawing attributes to use when drawing and displaying ink (ink that has not yet been recognized as text) in the InkEdit control 901 or the drawing attributes to apply to ink as it is drawn. A scroll-bars-disabled property 908 represents whether scroll bars in the InkEdit control 901 are enabled or disabled. A drag-icon property 909 represent the icon to be displayed as the pointer in a drag-and-drop operation. A factoid property 910 represents the factoid (discussed further herein) that a recognizer uses to constrain its search for the recognition result. Various font and text properties 911 represent the font of the text displayed by the InkEdit control 901, as well as the font name and size of the currently-selected text or at the insertion point. Other font and text properties 911 represent whether the currently-selected text (or at the insertion point) is bold, italicized, or underlined. Still other font and text properties 911 represent whether the currently-selected text (or at the insertion point) appears on the baseline, as superscript, or as subscript, the alignment of the same, as well as the color of the currently-selected text or at the insertion point. Various ink-mode properties 912 represent how ink is collected when drawn on the control and whether ink collection is disabled, whether only ink is to be collected, or whether both ink and gestures are to be collected. A control-lock property 913 represents whether the contents of the InkEdit control 901 can be edited. Various mouse properties 914 represent the current custom mouse icon to be displayed and the type of mouse pointer displayed when the mouse pointer is over the graphical depiction of the InkEdit control 901. A multiline property 915 represents whether the InkEdit control 901 is a multiline control. Various recognizer properties 916 represent which recognizer is to be used for recognition, and the amount of time after an ink stroke has ended that text recognition is to begin. A scrollbar property 917 represents the type of scrollbars to display in the InkEdit control 901. An ink-object property 918 represents the Ink object(s) that are within the currently-selected text. Setting this ink-object property may cause the current selection to be replaced with the results of the recognition from recognizing the list of ink objects passed in. Various selected-text properties 919 represent the currently-selected text within the InkEdit control 901, the number of characters selected, the selected Rich Text Format (RTF) formatted text, and the starting point of the selected text. Various text-in-control properties 920 represent the current text displayed in the text box of the InkEdit control 901 as well as the text in the InkEdit control 901 including all RTF formatted codes. A status property 921 represents whether the InkEdit control 901 is idle, collecting ink, or recognizing ink.

The InkEdit API in the illustrative embodiment also has a plurality of associated messages, events, and methods, in any combination or subcombination. Since the InkEdit control is a super class of the RichEdit control, every RichEdit message is passed directly on (in most cases) to have the same effect as in RichEdit. This also applies to event notification messages, which notify the InkEdit control's parent window that a particular event has occurred.

For example, a cursor-down message 940 is sent responsive to the cursor tip (e.g., the tip of stylus 204) physically contacting the digitizing surface (e.g., surface 202). A stroke-completed message 941 is sent, and a stroke-completed event occurs, responsive to a stroke being completed. A stroke-completed method occurs responsive to a stroke-completed event occurring. A gesture-completed message 942 is sent responsive to a gesture being completed, which may be indicated by a gesture-completed event.

The InkEdit API may further have recognition-related events, methods, and messages 943. Such recognition-related messages are sent responsive to recognition having occurred, or get or set the recognizer that is used. Another recognition-related message specifically forces recognition prior to the recognition timeout would otherwise cause recognition to occur. Recognition-related events occur responsive to an application-specific gesture being recognized, and in response to recognition in general. Recognition-related methods occur responsive to the recognition event being raised, or specify that a collection of strokes should be recognized and that recognition results are to be returned.

The InkEdit API may further have an event 944 that occurs responsive to the InkEdit control 901 being clicked upon, events 945 that occur responsive to a key being pressed or released, events 946 that occur responsive to the mouse pointer and/or stylus being over the InkEdit control 901 and being pressed, released, or double-clicked, and an event 947 that occurs responsive to the mouse pointer being moved over the InkEdit control 901.

The InkEdit API may further have a message 948 it uses for retrieving the status of the InkEdit control 901 based on the values defined in the ink edit status enumeration, methods 949 that load a specific type of file into the InkEdit control 901 or save the contents of the InkEdit control 901 to a specific type of file, and a method 950 for processing Windows messages.

The InkEdit API may further have messages 951 that retrieve or set the inking mode of the InkEdit control 901 based on the values defined in the ink mode enumeration, and messages 952 that retrieve or set the ink insertion mode of the InkEdit control 901, based on the values defined in the ink insert mode enumeration.

The InkEdit API may further have messages 953 that retrieve the current drawing attributes or set the future drawing attributes to be used in the InkEdit control 901, and messages 954 that retrieve or set the recognition timeout of the InkEdit control 901. The recognition timeout may be measured in, e.g., milliseconds.

The InkEdit API may further have gesture-status-related messages and methods 955. Gesture-status-related messages are defined that retrieve or set the gesture status for the InkEdit control 901. Gesture-status-related methods use the state of the gesture status to limit the set of gestures that may be recognized by the InkEdit control 901.

The InkEdit API may further have messages 956 that retrieve or set the recognizer to be used by the InkEdit control 901, messages 957 that retrieve or set the factoid to use for recognition, messages 958 that retrieve or set the currently-selected ink, messages 959 that retrieve or set the mouse icon that is displayed, and messages 960 that retrieve or set the mouse pointer to be displayed.

The InkEdit API may further have a constructor 961 for creating a new InkEdit control, and a method 962 that occurs when a handle is created for the InkEdit control 901. In the NET flavor of the InkEdit control, this method may be considered a constructor. the InkEdit API may further have a selection-changed event that occurs responsive to the selection of text within the control changing.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations. Also, it should be recognized that although various names of objects and other API elements are provided herein, such names are merely illustrative and any names may be used without departing from the scope of the invention.

We claim:

1. A computer-readable medium storing computer-executable instructions for performing a method, the method comprising:
    displaying a user-selectable element associated with a mode switch, said mode switch being associated with an ink edit control programming interface to set operational modes for ink edit control functions to control recognition functionality as applied to ink that is to be displayed, wherein the mode switch is switchable in response to a user selection of the element between a first setting to set a first operational mode and a second setting to set a second operational mode;
    receiving user input comprising ink to be displayed;
    displaying the received ink; and
    determining whether, at the time that the displayed ink was received, a currently existing setting of the mode switch is the first setting or the second setting;
    wherein if the second setting is determined to be the currently existing setting of the mode switch at the time that the displayed ink was received, then replacing the displayed ink with displayed recognized text according to the second operational mode, wherein the recognized text is a result of recognition of the displayed ink as text; and
    wherein if the first setting is determined to be the currently existing setting of the mode switch at the time that the displayed ink was received, then persistently displaying the displayed ink and not replacing the displayed ink with displayed recognized text, according to the first operational mode.

2. The computer-readable medium of claim 1, wherein the method further comprises storing the ink as an ink object.

3. The computer-readable medium of claim 1, wherein the method further comprises:
    receiving user input; and
    responsive to the user input, modifying how the ink is displayed by displaying the ink as bold ink or italicized ink.

4. The computer-readable medium of claim 1, wherein the method further comprises waiting a predetermined amount of time, and wherein displaying the recognized ink is performed after the predetermined amount of time expires.

5. The computer-readable medium of claim 4, wherein the predetermined amount of time is in a range of about 100 milliseconds to about 5000 milliseconds.

6. The computer-readable medium of claim 1, wherein the method further comprises receiving a user command, and wherein displaying the recognized ink is performed responsive to receiving the user command.

7. The computer-readable medium of claim 1, wherein the method further comprises:
    allowing user formatting of the displayed ink; and
    persistently storing the displayed ink and associated formatting in a data structure.

8. A method, comprising:
    displaying a user-selectable element associated with a mode switch, said mode switch being associated with an ink edit control programming interface to set operational modes for ink edit control functions to control recognition functionality as applied to ink that is to be displayed, wherein the mode switch is switchable in response to a user selection of the element between a first setting to set a first operational mode and a second setting to set a second operational mode;
    receiving user input comprising ink to be displayed;
    displaying the received ink; and
    determining whether, at the time that the displayed ink was received, a currently existing setting of the mode switch is the first setting or the second setting;
    wherein if the second setting is determined to be the currently existing setting of the mode switch at the time that the displayed ink was received, then replacing the displayed ink with displayed recognized text according to the second operational mode, wherein the recognized text is a result of recognition of the displayed ink as text; and
    wherein if the first setting is determined to be the currently existing setting of the mode switch at the time that the displayed ink was received, then persistently displaying the displayed ink and not replacing the displayed ink with displayed recognized text, according to the first operational mode.

9. The method of claim 8, further comprising storing the ink as an ink object.

10. The method of claim 8, further comprising:
    receiving user input; and
    responsive to the user input, modifying how the ink is displayed by displaying the ink as bold ink or italicized ink.

11. The method of claim 8, further comprising waiting a predetermined amount of time, and wherein displaying the recognized ink is performed after the predetermined amount of time expires.

12. The method of claim 11, wherein the predetermined amount of time is in a range of about 100 milliseconds to about 5000 milliseconds.

13. The method of claim 8, further comprising receiving a user command, and wherein displaying the recognized ink is performed responsive to receiving the user command.

14. The method of claim 8, further comprising:
allowing user formatting of the displayed ink; and
persistently storing the displayed ink and associated formatting in a data structure.

15. A method, comprising:
displaying a user-selectable element associated with a mode switch, said mode switch being associated with an ink edit control programming interface to set operational modes for ink edit control functions to control recognition functionality as applied to received ink, wherein the mode switch is switchable in response to a user selection of the element between a first setting to set a first operational mode and a second setting to set a second operational mode;
receiving user input comprising ink; and
determining whether, at the time that the ink was received, a currently existing setting of the mode switch is the first setting or the second setting;
wherein if the first setting is determined to be the currently existing setting of the mode switch at the time that the ink was received, then displaying the received ink according to the first operational mode; and
wherein if the second setting is determined to be the currently existing setting of the mode switch at the time that the ink was received, then displaying recognized text according to the second operational mode, wherein the recognized text is a result of recognition of the received ink as text.

16. The method of claim 15, further comprising storing the ink as an ink object.

17. The method of claim 15, further comprising:
receiving user input; and
responsive to the user input, modifying how the ink is displayed by displaying the ink as bold ink or italicized ink.

18. The method of claim 15, further comprising waiting a predetermined amount of time, and wherein displaying the recognized ink is performed after the predetermined amount of time expires.

19. The method of claim 18, wherein the predetermined amount of time is in a range of about 100 milliseconds to about 5000 milliseconds.

20. The method of claim 15, further comprising receiving a user command, and wherein displaying the recognized ink is performed responsive to receiving the user command.

21. The method of claim 15, further comprising:
allowing user formatting of the displayed ink; and
persistently storing the displayed ink and associated formatting in a data structure.

* * * * *